United States Patent [19]

Quynn

[11] Patent Number: 4,584,486

[45] Date of Patent: Apr. 22, 1986

[54] BLADE PITCH CONTROL OF A WIND TURBINE

[75] Inventor: Allen G. Quynn, Bellevue, Wash.

[73] Assignee: The Boeing Company, Seattle, Wash.

[21] Appl. No.: 597,933

[22] Filed: Apr. 9, 1984

[51] Int. Cl.⁴ .............................................. F03D 7/04
[52] U.S. Cl. ......................................... 290/44; 290/55
[58] Field of Search .................. 290/44, 55; 416/27, 416/30, 159

[56] References Cited

U.S. PATENT DOCUMENTS

| | | | |
|---|---|---|---|
| 2,866,933 | 12/1958 | Bond et al. | 318/489 |
| 3,201,675 | 8/1965 | Curran et al. | 318/489 |
| 3,758,838 | 9/1973 | Wright | 318/597 |
| 4,160,170 | 7/1979 | Harner et al. | 290/44 |
| 4,161,658 | 7/1979 | Patrick | 290/44 |
| 4,189,648 | 2/1980 | Harner | 290/44 |
| 4,193,005 | 3/1980 | Kos et al. | 290/44 |
| 4,339,666 | 7/1982 | Patrick et al. | 290/44 |
| 4,349,315 | 9/1982 | Ducker | 416/11 |

Primary Examiner—William M. Shoop, Jr.
Assistant Examiner—W. E. Duncanson, Jr.
Attorney, Agent, or Firm—Finnegan, Henderson, Farabow, Garrett & Dunner

[57] ABSTRACT

A control system for adjusting the pitch of variable-pitch angle blades in a wind turbine for generating electric power maintains the control signal for the variable-pitch angle blades above a minimum level representing the minimum desired angle of the variable-pitch blades. The control system includes a subtractor for generating a difference signal; a device for generating from the difference signal a first blade control signal greater than a minimum level, from a device for generating a second blade control signal greater than a minimum level, from first blade control signal and the difference signal; a device for generating a third blade control signal for adjusting the pitch of variable-pitch angle blades, from second blade control signal and power rate signal. All devices include limiters which limit their respective output signals to a minimum level representing a preset minimum blade angle.

10 Claims, 6 Drawing Figures

BLADE PITCH CONTROL OF A WIND TURBINE

BACKGROUND OF THE INVENTION

This invention relates to control systems for adjusting the pitch of variable-pitch angle blades, and specifically to a closed loop control system which automatically adjusts the pitch angle of wind turbine blades to maximize generated electrical energy, and maintain stability.

Systems for controlling the pitch of variable-pitch angle blades find application, for example, in a wind turbine driving a synchronous generator. Wind turbines, in effect large windmills, rotate and produce electrical energy in response to natural wind currents. The electrical energy can be stored, used to power isolated installations directly, or fed to power utility grids for ultimate distribution.

A major problem with wind turbines is that of controlling the electrical output power and power factor in the presence of unpredictable wind gusts and turbulence, particularly when the wind turbine is driving a synchronous generator connected to a large electrical network. Wind turbulence conditions can create shaft torque fluctuations of sufficient magnitude to cause the synchronous generator to reach dangerous power levels, cause protective circuit breakers to open and disconnect from the grid.

In an attempt to overcome this problem, certain wind turbines vary the pitch angle of the blades in a manner analogous to the blade pitch control of an aircraft in response to selected operating parameters, such as wind velocity, rotor speed and output power. A representative control system of this type is disclosed in U.S. Pat. No. 4,193,005 to Kos et al. Briefly, the Kos et al. patent teaches closed loop control of rotor blade acceleration rate and deceleration rate during startup and shutdown. The control uses a single control integrator for all closed loop operating modes with a rate limiter in front of the integrator to prevent integrator over-travel. Also employed is a closed loop shaft torque control for on-line power control.

To maximize the electrical power at low wind speeds from a wind turbine using variable-pitch angle blades, it is necessary to set the pitch angle of the blades at the angle which gives maximum torque. At this angle, however, a linear control system can become unstable since it is impossible to increase the aerodynamic torque to counteract decreasing power output caused by decreasing wind speed. A wind turbine consisting of a massive blade assembly connected to a synchronous generator by a flexible shaft and having a low resonant frequency will tend to oscillate.

A typical prior art control system is shown in FIG. 1. As shown, signal 10 representing a nominal blade angle, $B_O$, is added at a summing junction 14 to a signal 12, representing $Kdt/dp$, which is proportional to the rate of change of power generated by the wind turbine. Circuits to provide such signals as signal 12 are well known in the art. A signal 16 to control the pitch of the variable-pitch angle blades is provided at the output of summing junction 14. In order to get maximum power, signal 10, $B_O$, would be set at a value which produces maximum aerodynamic torque.

The problems with such a system can be explained using FIG. 2 which shows a graph of aerodynamic torque $Q_A$ versus the pitch angle, B, of the blades. In FIG. 2, curve 114 is for a high wind speed and curve 116 is for a low wind speed. In this example, the maximum torque occurs at a particular blade angle, which in FIG. 2 is 2 degrees for both high and low wind speeds. The equation describing the dynamics of a wind turbine connected to a synchronous generator through a flexible shaft is:

$$I\frac{dw}{dt} = Q_A - KS \quad (1)$$

where:
I = inertia of blade assembly;
w = angular velocity of blade assembly;
$Q_A$ = aerodynamic torque;
δ = twist angle of the flexible shaft; and
K = stiffness constant of the flexible shaft.

For a synchronous generator, the instantaneous electric power, P, is proportional to the shaft torque, Kδ, and the generator is forced to rotate at constant speed, $W_O$. It follows that:

$$\frac{d^2P}{dt^2} = W_O K \frac{dw}{dt}, \quad (2)$$

Equation (1) can be re-written as:

$$\frac{d^2P}{dt^2} = -K_1 P + K_2 Q_A \quad (3)$$

where:
$K_1 = K/I$; and $$K_2 = \frac{W_O K}{I}$$

A control law which effectively damps out oscillations in P is one which controls blade angle, B, so that:

$$Q_A = \frac{-C\, dP}{dt}. \quad (4)$$

If the nominal operating point is at 120 on FIG. 2, then $$B = K_3 \frac{dP}{dt} + B_N \quad (5)$$

where:
$K_3$ = derivative gain;
$B_N$ = steady state blade angle for nominal power.
The torque, $Q_A$, will decrease and increase as dt/dp varies up and down from zero.

To obtain the maximum power from a given low wind speed, it is necessary to set the nominal operating point at 118 in FIG. 2, which is at the peak of the torque curve where the blade angle is $B_O$. The control law in equation (5), however, will not work effectively at this point since the torque can only decrease regardless of how B changes. Hence the prior art control system in FIG. 1 is unsatisfactory.

The present invention overcomes these disadvantages by limiting the blade angle B so that it is never less than $B_O$. The present invention provides damping through the use of limiters so that the nominal operating point of a wind turbine can stay at its peak, for example at point 118 in FIG. 2, thereby providing maximum power.

SUMMARY OF THE INVENTION

An objective of the present invention is a control system for a wind turbine, with controllable pitch blades, that maximizes the power output without creating mechanical instability. This is accomplished by limiting the blade angle to a value which gives maximum torque during a low wind, but allowing the blade angle to increase as required to provide damping.

Additional objectives and advantages of this invention will be set forth in part in the description which follows and in part will be obvious from the description or may be learned by practice of the invention. The objectives and advantages of the invention may be realized and attained by means of instrumentalities and combinations particularly pointed out in the appended claims.

To achieve the objectives and in accordance with the purpose of the invention, as embodied and broadly described herein, the present invention in its simplest form as shown in FIG. 3 provides for controlling the blade angle of variable-pitch angle blades of a wind turbine by adding a signal representing the blade angle for maximum torque and a signal proportional to the rate of change of power from the wind turbine, and limiting the resulting sum so that it cannot go beyond the point of maximum torque. This results in one-sided damping, which, with sufficient gain, suffices to limit oscillation to occasional cycles of small amplitude, and yet retains the efficiency of operating at maximum torque.

A more elaborate and practical embodiment of this invention, shown in FIG. 5, includes additional features to allow operation in high winds as well as low. It comprises the following: a first adder generates a difference signal representing the difference between a signal proportional to the power generated by the wind turbine and a power reference signal; the output of this adder is integrated and limited so that the output signal goes no lower than a level representing a preset minimum blade angle. This output signal is added by a second adder to the output of the first adder, and the sum is limited by a second limiter; the power signal is fed to a differentiating circuit to generate a rate signal proportional to the rate of change of power generated by the turbine. This rate signal is added to the output of the second limiter and the resulting sum is fed to a third limiter. The output of this limiter is the blade command and it is fed to the blade actuator. All the limiters limit their output to values no less than a preset minimum value.

The accompanying drawings, which are incorporated in and constitute a part of this specification, illustrate embodiments of this invention and, together with the description, serve to explain the principles of the invention.

DESCRIPTION OF THE PREFERRED EMBODIMENT

Reference will now be made in detail to the preferred embodiments of this invention, examples of which are illustrated in the accompanying drawings.

Figure 1:
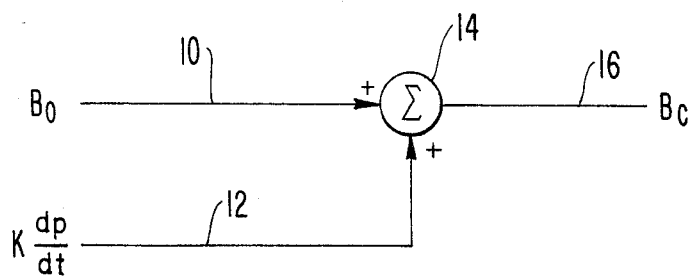
FIG. 1 is a block diagram of a rudimentary prior art wind turbine control system.
Figure 2:
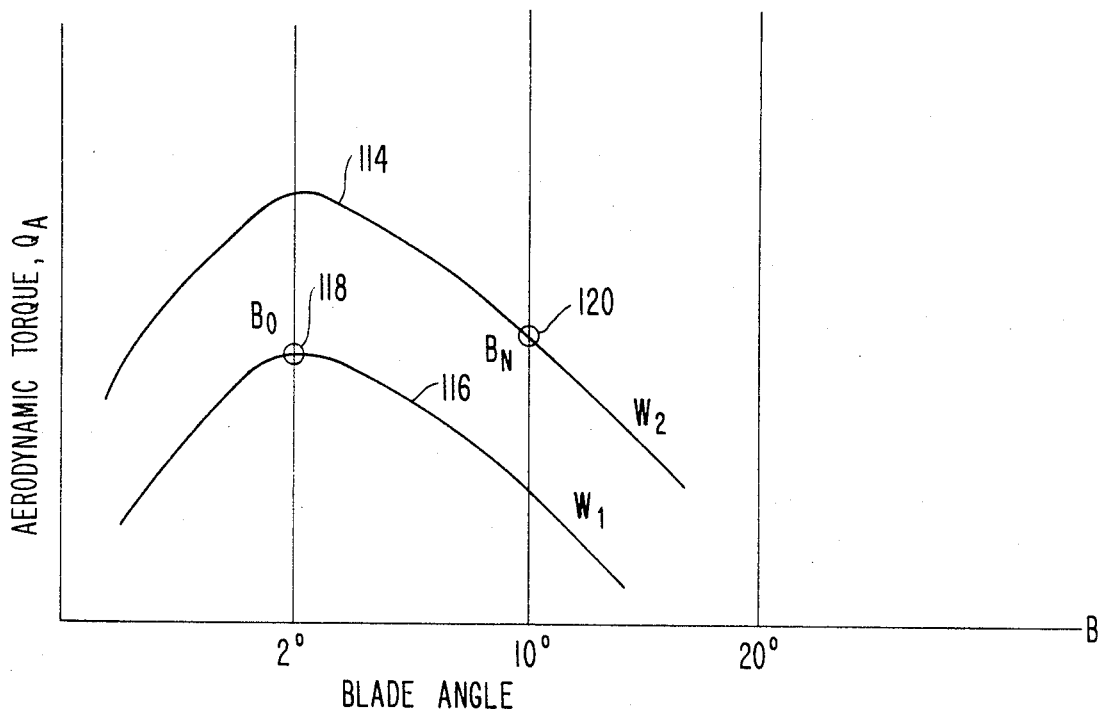
FIG. 2 illustrates the relationship between aerodynamic torque and blade pitch angle of a wind turbine.
Figure 3:
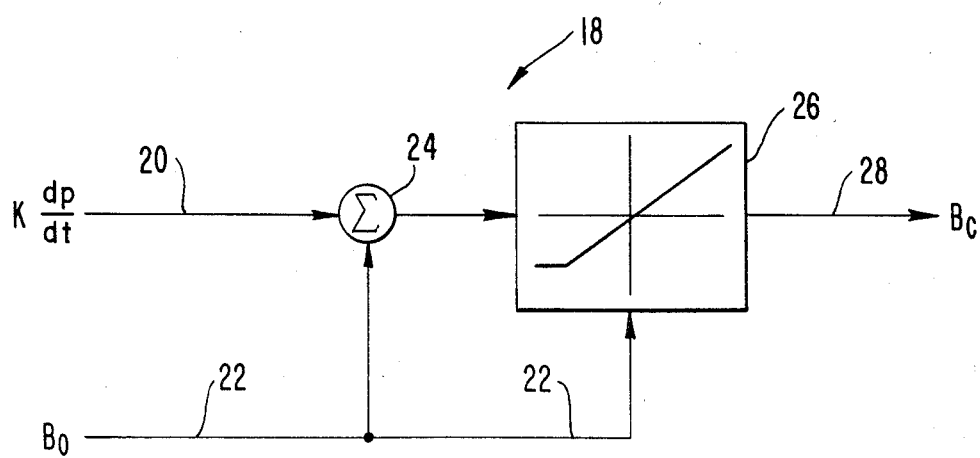
FIG. 3 is a block diagram illustrating the principle of a control system for adjusting the pitch of variable-pitch angle blades in a wind turbine of the present invention.
Figure 4:
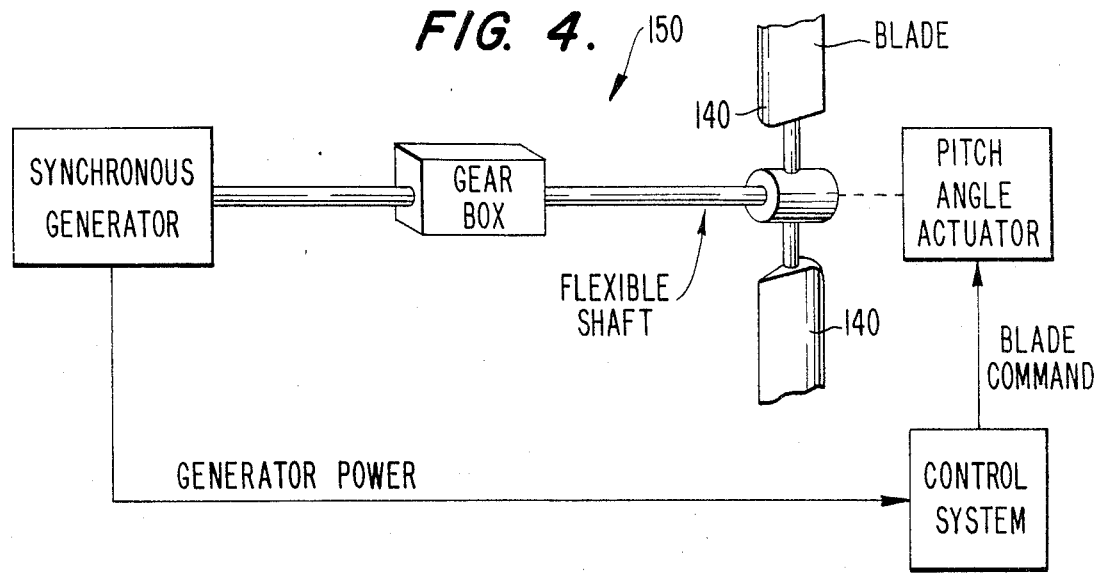
FIG. 4 illustrates a wind turbine with a control system for adjusting the pitch of variable-pitch angle blades.

FIG. 3 shows a rudimentary control system for adjusting the pitch of variable-pitch angle blades in a wind turbine, for example blades 140 in wind turbine 150 shown in FIG. 4. The control system 18 responds to an externally generated blade control signal 22, shown as level $B_O$, which corresponds to a predetermined minimum desired blade angle for the variable-pitch blades and generates a blade command signal 28.

In accordance with the present invention, control system 18 of FIG. 3, contains a summer, 24, which adds a signal 20 proportional to the rate of change of electrical power generated from the wind turbine and a nominal blade angle signal 22. K dP/dt represents a signal proportional to the rate of change of power generated by the wind turbine. The signal dP/dt is derived by methods and devices well known in the art, such as a differentiating circuit. The nominal blade angle signal, $B_O$, represents the minimum blade angle desired.

The present invention also includes means, for ensuring that the control signal from the adder, 24, is above a minimum level. This is done by a limiter, 26, which limits the output from the adder 24 so that it remains above a preset minimum level, $B_O$, the minimum blade angle signal.

Figure 5:
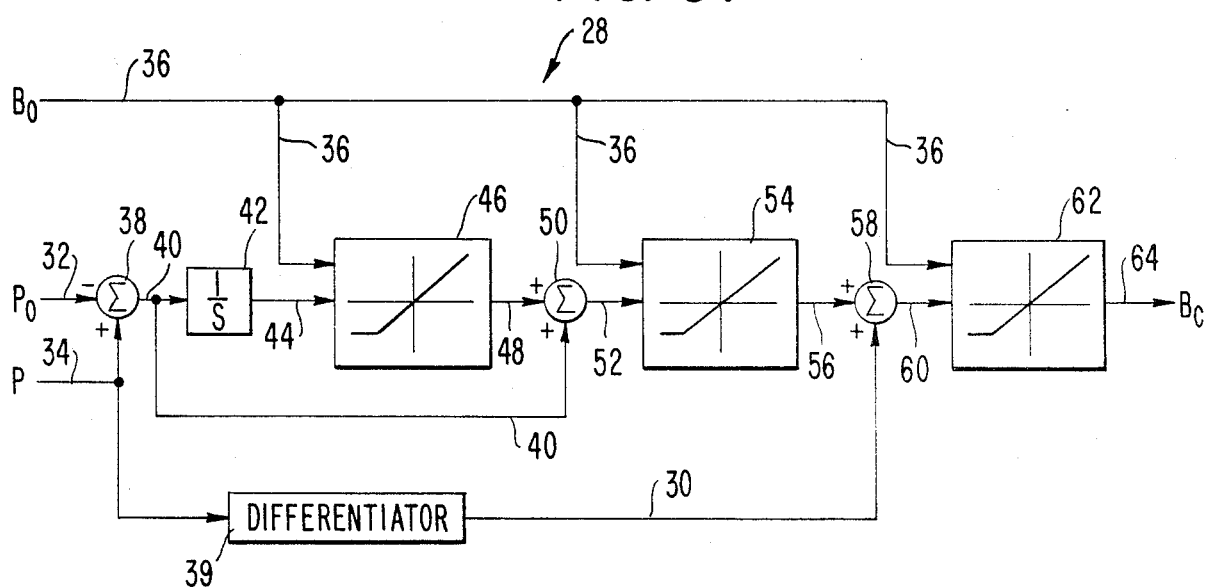
FIG. 5 is a block diagram of the preferred embodiment of a control system for adjusting the pitch of variable-pitch angle blades in a wind turbine of the present invention.

A more elaborate and practical control system according to the present invention is shown in FIG. 5 and is represented by numeral 28. Two inputs to system 28 are $P_O$, a predetermined power reference signal representing a desired electric power value, and P, a signal proportional to the electric power generated by the wind turbine containing system 28. Signal P can be derived by well known power sensors.

In accordance with the present invention, control system 28 includes subtraction means for generating a difference signal representing the difference between a signal, P, proportional to the electric power generated by the wind turbine and a power reference signal, $P_O$. As embodied herein, adding means includes an adder 38 for generating a signal 40. Power reference signal $P_O$ is fed to adder 38 at terminal 32 and power signal P is fed to adder 38 via terminal 34 from the wind turbine.

In accordance with the present invention, the control system 28 includes means for generating a blade control signal including means for maintaining the blade control signal above a minimum level. The difference signal 40 is fed to an integrator, 42, thereby producing integrator output signal 44, which is fed to limiter 46 which limits integrator output signal 44 to values greater than $B_O$ which represents the desired minimum blade angle. Signal 52 is the output of adder 50 which is the sum of signals 40 and 48. This sum, signal 52, is fed to limiter 54, where it is limited to values greater than $B_O$. A differentiating circuit, 39, generates a signal proportional to dP/dt from the power signal, 34. The outputs of 39 and 54 are fed to adder 58.

Adder 58 adds the signal 30, K dP/dt, and signal 56 to produce signal 60. Like limiters 46 and 54, limiter 62 limits adder output signal 60 to values above the level represented by $B_O$. Signal 64 from limiter 62 then controls the pitch of the blades. The system of limiters, integrators, and adders can be implemented with operational amplifiers and diodes, or by a programmed digital computer, as most appropriate to the desired application.

In accordance with the invention, at wind speeds which are too low to give the desired rated power, the limited integrator output signal 48 is driven to the lower limit $B_O$ and held there. This lower limit represents the blade angle which will give maximum torque for low wind speeds. Thus, at the low wind speeds, limiter output signal 48 will be set at the value of blade limit signal 36, which corresponds to the blade angle giving maximum torque.

When adder output signal 52 is below $B_O$ then limiter 54 will set output signal 56 at the level $B_O$. When signal 56 is at $B_O$ and signal 30, dP/dt, is positive, indicating increasing generated electric power, signal 64 will increase to control the pitch angle of the blades and decrease the torque. If, on the other hand, dP/dt is negative, signal 64 will not decrease, but remain at $B_O$, giving maximum torque. This provides maximum power at low wind speeds as well as damping. Thus limiter 62 provides onesided damping.

Figure 6:
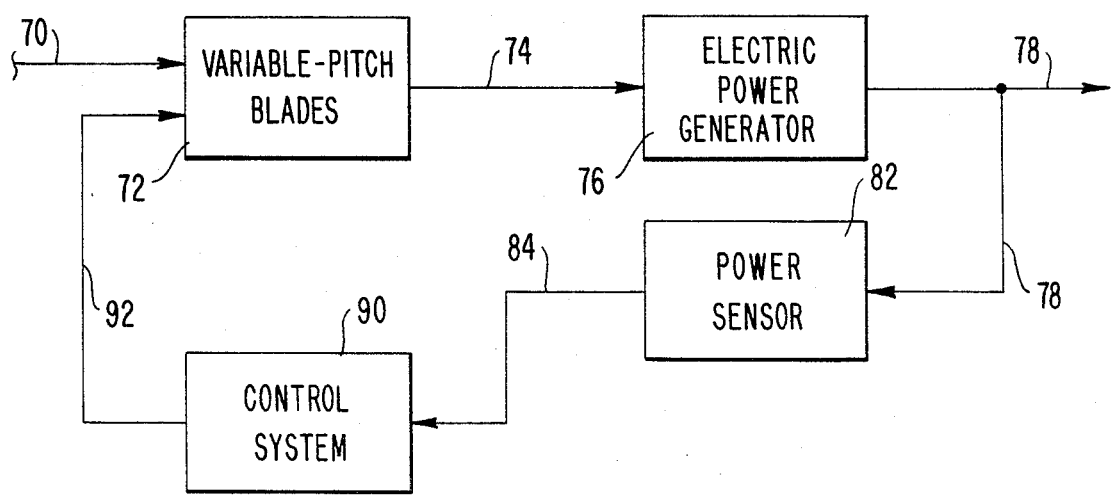
FIG. 6 is a block diagram of a wind turbine system having a variable-pitch blade control system.

FIG. 6 is a block diagram illustrating the entire wind turbine with a control system of the present invention for adjusting the pitch of variable-pitch angle blades. In response to wind 70, variable-pitch blades 72 create torque 74. The amount of torque is controlled by the angle of the blades. Electric power generator 76 creates output electrical power 78 from torque 74.

In accordance with the present invention, the wind turbine includes means for sensing the output power 78. In FIG. 6, the means for sensing the output power is power sensor 82.

Control system 90 controls the pitch angle of the blades with output signal 92 in response to the power signal 84 produced by power sensor 82. Control system 90 is preferably the control system shown in FIG. 5.

From the preceding explanation, it is clear how the wind turbine system represented in FIG. 6 maximizes the power it generates by maintaining the nominal blade pitch angle during low wind conditions, at the value for maximum torque, while allowing it to vary in the direction of decreasing torque to maintain stability.

It will be apparent to those skilled in the art that various modifications and variations can be made in the control system for adjusting the pitch of variable-pitch angle blades in a wind turbine of the present invention and in the construction of the control system without departing from the scope or spirit of the invention. Thus, it is intended that the present invention cover the modifications and variations of this invention provided they come within the scope of the appended claims and their equivalents.

What is claimed is:

1. A control system for adjusting the pitch of variable-pitch angle blades in a wind turbine generating electric power and for maintaining dynamic stability under all conditions, wherein at low wind speeds said control system maintains the pitch of said blades at an angle close to the value providing maximum torque, and at high wind speeds said control system adjusts the pitch of said blades to maintain rated power, said control system comprising:
   a. means for adding a signal proportional to the rate of change of electric power generated by said wind turbine and a nominal blade control signal; and
   b. means, coupled to said adding means, for generating a control signal from the output of said adding means to control the pitch of said variable-pitch blades, said generating means including means for ensuring that the values of said control signal remain above a minimum level needed to ensure the blade pitch at said angle close to the value for providing maximum torque.

2. A control system as described in claim 1 wherein said nominal blade control signal remains constant at said minimum level.

3. A control system as described in claim 1, further comprising:
   a. means for subtracting a predetermined reference power signal from a signal representing the electric power generated by said wind turbine; and
   b. means, coupled to said subtracting means, for generating from the output of said subtracting means said nominal blade control signal, said nominal blade control signal generating means including means for maintaining said nominal blade control signal above said minimum level.

4. A control system for adjusting the pitch of variablepitch angle blades in a wind turbine for generating electric power, said control system comprising:
   a. means for subtracting a signal corresponding to the electric power output generated by said wind turbine and a predetermined power reference signal;
   b. means, coupled to the output of said subtracting means, for generating a first blade control signal greater than a minimum level which corresponds to a predetermined minimum blade angle for said variable-pitch angle blades;
   c. means, coupled to said first blade control signal and said subtracting means, for generating a second blade control signal greater than said minimum level; and
   d. means, coupled to said second blade control signal and to a signal proportional to the rate of change of electric power generated by said wind turbine, to generate a third blade control signal greater than said minimum level, said third blade control signal being used to adjust the pitch of said variablepitch angle blade.

5. The control system in claim 4 wherein each of said means for generating said first, second and third blade control signals includes a limiter.

6. The control system in claim 5 wherein said means for generating said first blade control signal and the means for generating said second blade control signal each includes an adder.

7. The control system in claim 6 wherein said means for generating said first blade control signal includes an integrator.

8. A control system for adjusting the pitch of variable-pitch angle blades in a wind turbine for generating electric power, said control system comprising:
   a. a subtractor for generating a difference signal representing the difference between a signal proportional to the electric power generated by said wind turbine and a predetermined power reference signal;

b. an integrator coupled to said substractor for integrating said difference signal;
c. a first limiter coupled to said integrator to keep the output from said integrator greater than a minimum level representing a desired minimum blade angle for said variable-pitch angle blades;
d. a first adder coupled to said subtractor and said first integrator for adding the output of said first limiter and said difference signal;
e. a second limiter coupled to said first adder to keep the output from said first adder above said minimum level;
f. a second adder coupled to said second limiter for adding the output of said second limiter and a signal proportional to the rate of change of electric power generated by said wind turbine; and
g. a third limiter coupled to said second adder to keep the output of said second adder above said minimum level, the output from said third being used to control the pitch of said variable-pitch angle blades.

9. A wind turbine for generating electric power comprising:
   a. a plurality of variable-pitch angle blades;
   b. means for generating electric power from the rotation of said plurality of variable-pitch angle blades caused by wind; and
   c. means for controlling the pitch of each of said plurality of variable-pitch angle blades, said controlling means including:
      i. means for subtracting a signal corresponding to the electric power output generated by said wind turbine and a predetermined reference signal;
      ii. means, coupled to the output of said subtracting means, for generating a first blade control signal greater than a minimum level which corresponds to a predetermined minimum blade angle for said variable-pitch angle blades;
      iii. means coupled to said first blade control signal and said subtracting means, for generating a second blade control signal greater than said minimum level; and
      iv. means, coupled to said second blade control signal and to a signal proportional to the rate of change of power generated by said wind turbine, to generate a third blade control signal greater than said preset minimum level, said third blade control signal being used to adjust the pitch of said variable-pitch angle blade.

10. A wind turbine system for generating electric power, comprising:
    a. a plurality of variable-pitch angle blades;
    b. means for varying the pitch of said variable-pitch angle blades, said varying means being controlled by a blade angle output signal;
    c. means for generating electrical power from the rotation of said plurality of variable-pitch angle blades;
    d. means for sensing the output power from said generating means;
    e. means for sensing the rate of change of output power from said generating means; and
    f. means for controlling the pitch of said variablepitch angle blades, said controlling means including:
       i. means for subtracting the output of said output power sensing means and a predetermined reference signal;
       ii. means, coupled to the output of said subtracting means, for generating a first blade control signal greater than a minimum level which corresponds to a predetermined minimum blade angle for said variable-pitch angle blades;
       iii. means coupled to said first blade control signal and said subtracting means, for generating a second blade control signal greater than said minimum level; and
       iv. means, coupled to said second blade control signal and to the output of said output power rate sensing means for generating said blade angle output signal.

* * * * *